United States Patent
Cherkasova et al.

(10) Patent No.: US 7,613,818 B2
(45) Date of Patent: Nov. 3, 2009

(54) SEGMENT-BASED MODEL OF FILE ACCESSES FOR STREAMING FILES

(75) Inventors: Ludmila Cherkasova, Sunnyvale, CA (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1655 days.

(21) Appl. No.: 10/601,354

(22) Filed: Jun. 23, 2003

(65) Prior Publication Data
US 2004/0261091 A1 Dec. 23, 2004

(51) Int. Cl.
*G06F 15/16* (2006.01)

(52) U.S. Cl. .................... 709/231; 703/1; 703/2

(58) Field of Classification Search ......... 709/223–226, 709/231; 725/88–92; 703/88–92
See application file for complete search history.

(56) References Cited

U.S. PATENT DOCUMENTS

| | | | |
|---|---|---|---|
| 5,732,239 A | 3/1998 | Tobagi et al. | |
| 5,734,119 A | 3/1998 | France et al. | |
| 5,815,662 A * | 9/1998 | Ong ......................... | 725/92 |
| 6,101,547 A | 8/2000 | Mukherjee et al. | |
| 6,178,480 B1 | 1/2001 | Tobagi et al. | |
| 6,434,621 B1 | 8/2002 | Pezzillo et al. | |
| 6,448,798 B1 | 9/2002 | Shinmori | |
| 6,466,980 B1 * | 10/2002 | Lumelsky et al. ........... | 709/226 |
| 6,564,332 B1 | 5/2003 | Nguyen et al. | |
| 7,310,681 B2 * | 12/2007 | Cherkasova et al. ......... | 709/233 |
| 7,424,528 B2 * | 9/2008 | Cherkasova et al. ......... | 709/224 |
| 2002/0083124 A1 | 6/2002 | Knox et al. | |
| 2002/0091722 A1 | 7/2002 | Gupta et al. | |
| 2002/0129048 A1 | 9/2002 | Qiu et al. | |
| 2002/0130712 A1 | 9/2002 | Naffziger et al. | |
| 2002/0150102 A1 * | 10/2002 | Janko et al. ................. | 370/392 |
| 2004/0034870 A1 * | 2/2004 | O'Brien et al. .............. | 725/88 |

FOREIGN PATENT DOCUMENTS

JP 2004062727 2/2002

OTHER PUBLICATIONS

Wenting Tang et al, "Modeling and generating realistic streaming media server workload", Computer Networks 51 (2007), pp. 336-356.*
Songqing Chen et al. "Segment-Based Proxy Caching for Internet Streaming Media Delivery", 2005 IEEE, pp. 59-67.*
Chase, J. et al., "Managing Energy and Server Resources in Hosting Centers," Dept. of Computer Science, Duke University, 14 pages.

(Continued)

*Primary Examiner*—Krisna Lim

(57) ABSTRACT

A system and method for modeling accesses of a streaming file are provided. In certain embodiments, the method comprises identifying, for a time interval of interest, at least one request received at a server for accessing a streaming file, and for each of the at least one request, determining a segment of the streaming file accessed during the time interval of interest. If multiple requests are identified for the streaming file during the time interval of interest, then determining, from the determined segments of the streaming file accessed by each of the multiple requests, at least one unique segment of the streaming file that was most recently accessed within the time interval of interest.

29 Claims, 4 Drawing Sheets

OTHER PUBLICATIONS

Eager, D. et al., "Optimal and Efficient Merging Schedules for Video-on-Demand Servers," Proc. ACM Multimedia 1999, 4 pages.

Nahrstedt, K. et al., "A Probe-based Algorithm for QoS Specification and Adaptation," Univ. of Illinois at Urbana Champaign, pp. 1-12.

U.S. Appl. No. 10/306,279, Cherkasova et al.

Nahrstedt, K. et al., "QoS-Aware Resource Managment for Distributed Multimedia Applications," Univ. of Illinois at Urbana Champaign, Dept. of Computer Science, pp. 1-37.

Ranjan, S. et al., "QoS-Driven Server Migration for Internet Data Centers," Proc. of IWQoS 2002, 10 pages.

Shenoy, P. et al., "Middleware versus Native OS Support: Architectural Considerations for Supporting Multimedia Applications," Univ. of Massachusetts, Dept. of Computer Science, 10 pages.

Cherkosova, L. et al., "Building a Performance Model of Streaming Media Applications in Utility Data Center Environment," Hewlett-Packard Laboratories, Internet Systems and Storage Lab, 12 pages.

Acharya, S. et al., "Characterizing User Access To Videos On The World Wide Web," Part of the IS&T/SPIE Conference on Multimedia computing and Networking 2000, SPIE vol. 3969, 2000, pp. 130-141.

Almeida, J. et al., "Analysis of Educational Media Server Workloads," Proc. 11th Int'l. Workshop, 2001, 10 pages.

Dan, A. et al., "Buffering and Caching in Large-Scale Video Servers," IEEE 1995, pp. 217-224.

Kim, I. et al., "VBR Video Data Scheduling using Window-Based Prefetching," IEEE 1999, pp. 159-164.

Cherkasova, L. et al., "Characterizing Locality, Evolution, and Life span of Accesses in Enterprise Media Server Workloads," NOSSDAV '02, May 12-14, 2002, 10 pages.

Foreign Search Report issued for GB 0 41 7995.8, dated Dec. 20, 2004.

* cited by examiner

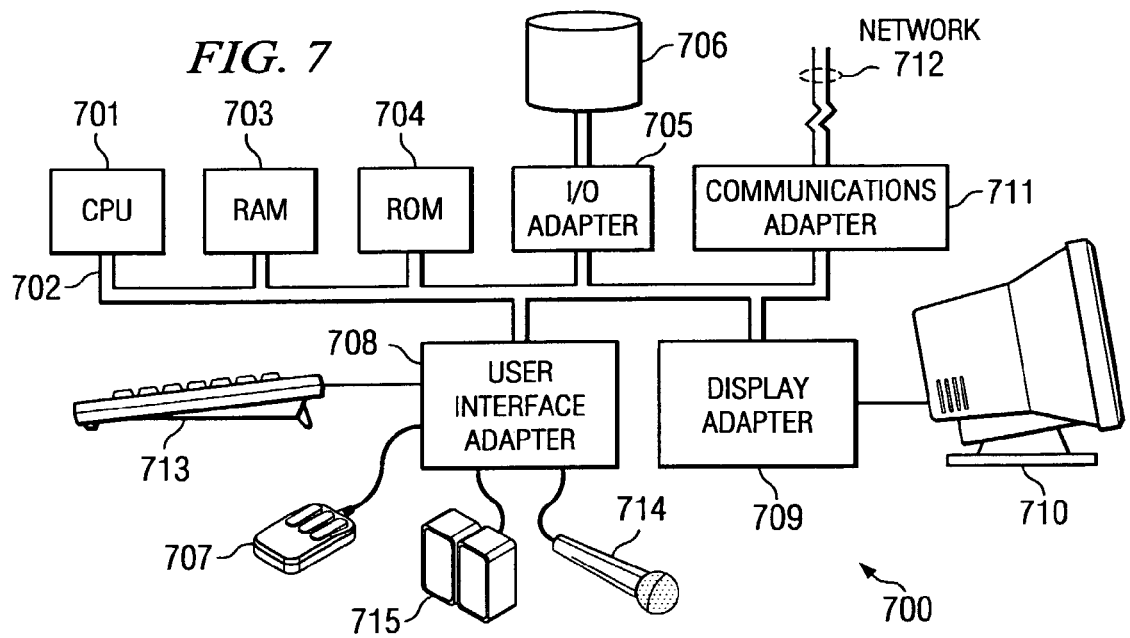

SEGMENT-BASED MODEL OF FILE ACCESSES FOR STREAMING FILES

CROSS-REFERENCE TO RELATED APPLICATIONS

This application is related to co-pending and commonly assigned U.S. patent application Ser. No. 10/306,279 filed Nov. 27, 2002, entitled "SYSTEM AND METHOD FOR MEASURING THE CAPACITY OF A STREAMING MEDIA SERVER," the disclosure of which is hereby incorporated herein by reference, and which issued on Sep. 9, 2008, as U.S. Pat. No. 7,424,528.

FIELD OF THE INVENTION

The present invention relates in general to systems and methods for modeling the memory of a media server, and more specifically to systems and methods for providing a segment-based model of file accesses for streaming media applications.

DESCRIPTION OF RELATED ART

Today, much information is stored as digital data that is available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an increasing amount of information available to users via client-server networks.

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." Streaming media is a well-known technology in the computer arts. In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (a media server) to a client and begins playing on the client before fully downloaded.

Streaming media is a particularly popular technique for communicating audio and/or video files from a server to a client. Audio and video files tend to be quite large, even after being compressed. If streaming media is not used, an entire file is generally required to be downloaded to a client before the client can begin to play the file. Such a download may require an undesirably long delay before the client can begin playing the file. With streaming media (e.g., streaming audio or streaming video), a client is not required to wait until the entire file is downloaded to play it. Instead, the client can begin playing the file (e.g., presenting the video and/or audio to a user) while it downloads to the client.

Streaming media has quickly become the most popular form of multimedia content on the Internet. Video from news, sports, and entertainment sites are more popular than ever. Media servers are also being used for educational and training purposes by many universities. Further, use of media servers in the enterprise environment is also gaining momentum. Many radio broadcasts are available over the Internet, which make use of streaming audio to enable a much wider audience access to their broadcasts.

In view of the above, the area of multimedia services in a networked environment is a rapidly expanding field in today's technological world. The delivery of continuous media from a central server complex to a large number of (geographically distributed) clients is a challenging and resource intensive task. Media servers are commonly implemented for providing streaming media to clients. Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server for supporting a given "workload" (i.e., a number of concurrent client accesses of streaming media from the media server).

BRIEF SUMMARY OF THE INVENTION

In certain embodiments of the present invention, a method for modeling accesses of a streaming media file is provided. The method comprises determining, for a time interval of interest, at least one unique segment of a streaming media file accessed during the time interval of interest by at least one client. The method further comprises creating a data structure representing the determined at least one unique segment of the streaming media file.

In certain embodiments, a method for modeling accesses of a streaming file from a server is provided. The method comprises identifying, for a time interval of interest, at least one request received at a server for accessing a streaming file, and for each of the at least one request, determining a segment of the streaming file accessed during the time interval of interest. If multiple requests are identified for the streaming file during the time interval of interest, then determining, from the determined segments of the streaming file accessed by each of the multiple requests, at least one unique segment of the streaming file that was most recently accessed within the time interval of interest.

In certain embodiments, a system comprises a media server operable to serve at least one streaming file to clients communicatively coupled thereto. The system further comprises access modeling logic operable to create a data structure for modeling accesses of the at least one streaming file during file during a time interval of interest by at least one of the clients. The data structure includes, for each of the at least one streaming file accessed during the time interval of interest, information identifying at least one unique segment of the streaming file and information identifying a timestamp for each of the at least one unique segment corresponding to the most recent access of the segment during the time interval of interest.

In certain embodiments, computer-executable software code stored to a computer-readable medium, such as a recordable data storage medium, is provided. The computer-executable software code comprises code for identifying, for a time interval of interest, at least one request received at a server for accessing a streaming file, and code for determining, for each of the at least one request, a segment of the streaming file accessed during the time interval of interest. The computer-executable software code further comprises code for determining, if multiple requests are identified for the streaming file during the time interval of interest, at least one unique segment of the streaming file that was most recently accessed within the time interval of interest.

In certain embodiments, a method of modeling streaming file accesses is provided. The method comprises creating a segment-based data structure modeling streaming file accesses, wherein the data structure for a streaming file comprises (a) identification of at least one unique segment of the streaming file that was accessed by at least one client of a media server, and (b) identification of a corresponding timestamp of a most recent access of each of the at least one unique segment.

BRIEF DESCRIPTION OF THE DRAWINGS

FIG. 7 shows an example computer system on which embodiments of the present invention may be implemented.

DETAILED DESCRIPTION

Figure 1:
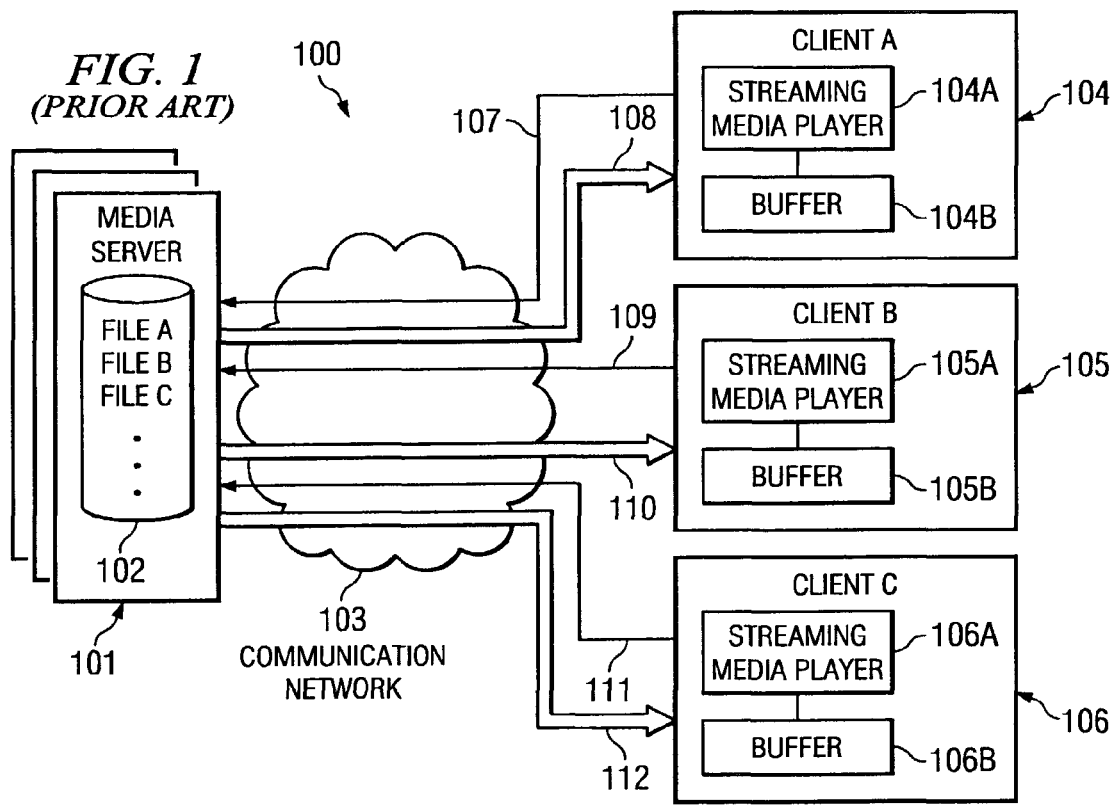
FIG. 1 shows an example client-server system in which embodiments of the present invention may be implemented.

Embodiments of the present invention provide a system and method for modeling accesses of a streaming file. More specifically, a segment-based access model is disclosed herein. In certain embodiments, the segment-based access model comprises an identification of at least one unique segment of a file with a corresponding identification of the time of its most recent access. That is, considering that a streaming file may be concurrently accessed (or have overlapping accesses thereto), various portions (or segments) of the streaming file may have different time stamps at which they have been most recently accessed by a client. As used herein, a streaming file is intended to encompass any type of file now known or later discovered that is served in a streaming fashion. Examples of a streaming file include well-known streaming media files, such as streaming audio and/or streaming video files.

Certain embodiments of the present invention utilize a data structure for a streaming file that includes identification of at least one unique segment of the streaming file with a corresponding identification of the most recent access of such unique segment. For instance, a segment-based data structure may be created for a streaming file based on client accesses of the streaming file during a time interval of interest, wherein such segment-based data structure identifies the most recent access of such streaming file, and if different portions (or unique segments) of the file have different most recent access times, each such unique segment is identified in the segment-based data structure with its corresponding most recent access time. In some instances, a first segment having a first sequential portion of a streaming file may have a more recent access timestamp than a later sequential portion of the streaming file, and a segment-based data structure may identify each unique, sequential portion of the streaming file along with its corresponding most recent access timestamp.

For example, a first client may request, at time t=0 seconds, access to a streaming media file f that is 600 seconds in duration, and a second client may request access to such streaming media file f 10 seconds later, at time t=10 seconds. Given the real-time nature of streaming media files, at time t=50 seconds, the first client will have accessed 50 seconds of file f (i.e., the segment from 0 seconds to 50 seconds of file f), and the second client will have accessed 40 seconds of file f (i.e., the segment from 0 seconds to 40 seconds of file f). However, the second client's access of the segment 0-40 seconds of file f is more recent than the first client's access of that segment. That is, the second client's access of the segment 0-40 seconds of file f started at time t=10 seconds, whereas the first client's access of that segment started at time t=0 seconds. But, the first client has most recently accessed the segment 40-50 seconds of file f (i.e., such access of segment 40-50 seconds of file f was started by the first client at time t=40 seconds), and the second client has not yet accessed this segment at all. A segment-based access model of an embodiment of the present invention is utilized for file f to represent that segment 0-40 seconds of file f was most recently accessed starting at time t=10 seconds and segment 40-50 seconds of file f was most recently accessed starting at time t=40 seconds.

Such a segment-based access model may be used for constructing a segment-based model of a media server's memory, as described further below. More specifically, a segment-based memory model is disclosed that provides a close approximation of a real system memory but reflects a higher-level memory abstraction. Such a segment-based memory model identifies the segments of files (e.g., streaming media files) that are stored to the media server's memory at any given time. Thus, the memory model may be used to significantly simplify the computation of a current memory state of the media server. For instance, as described further below, the memory model may be used to identify the segments of streaming media files that are stored to the media server's memory at a given time, and thus a determination of the media server's resources that will be consumed in servicing another request may be computed. That is, the memory model may be used to determine whether the memory resources or the disk resources of a media server will be consumed in servicing a received request for a particular streaming media file. Such a memory model may be useful for efficiently computing the media server's memory state for implementing an admission control policy for determining whether the media server can service a particular client request without undesirably degrading the quality of service.

Various embodiments of the present invention are now described with reference to the above figures, wherein like reference numerals represent like parts throughout the several views. Turning first to FIG. 1, an example client-server system 100 is shown in which embodiments of the present invention may be implemented. Client-server system 100 comprises a plurality of clients 104, 105, and 106, and a media server (or complex of media servers) 101. As used herein, a media server (or "streaming media server") is intended to encompass any processor-based device now known or later developed that is capable of serving one or more streaming files to clients thereof. Of course, such a media server (or "streaming media server") may be further operable to also serve other types of files to its clients. Clients 104-106 are each capable of communicatively accessing media server(s) 101 via communication network 103. Communication network 103 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other.

Media server(s) 101 of the illustrated embodiment comprise data storage 102 for storing streaming media files, such as File A, File B, and File C. Data storage 102 may comprise internal or external disk drives, floppy disks, optical disks, Compact Discs (CDs), Digital Versatile Discs (DVD), memory, and/or other data storage devices now known or later developed for storing digital data. For instance, as described further below, data storage 102 typically comprises at least disk resources and memory resources for storing streaming media files (or segments thereof). In operation, a client may request a streaming media file available from media server 101, and such media server 101 may serve the streaming media file as a stream to the requesting client via communication network 103. That is, a client may request a particular content (e.g., audio, video, or other type of content) and media server 101 may serve a streaming media file as a stream to provide the requested content to the requesting client.

Media server 101 may comprise streaming media file(s) that is/are encoded for transmission at each of a plurality of different bit rates. For example, a streaming media file, File A, may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage 102, e.g., File $A_1$ encoded for transmission at 28 Kb/s and File $A_2$ encoded for transmission at 56 Kb/s may each be stored to data storage 102 (note that files $A_1$ and $A_2$ comprise substantially the same content but are encoded for transmission at different bit rates, and thus the quality of each file may differ). As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

Media server 101 generally attempts to serve the most appropriate encoded file to a client based at least in part on the client's access speed to the client-server network 103. For example, suppose client 104 has a 28 Kb/s speed connection to communication network 103, client 105 has a 56 Kb/s speed connection to communication network 103, and media server 101 comprises File $A_1$ encoded at 28 Kb/s and File $A_2$ encoded at 56 Kb/s stored to data storage 102; when client 104 requests the content of File A, media server 101 typically attempts to serve File $A_1$ to client 104 (as File $A_1$ is the highest-quality encoded file supportable by client 104's connection speed), and when client 105 requests the content of File A, media server 101 typically attempts to serve File $A_2$ to client 105 (as File $A_2$ is the highest-quality encoded file supportable by client 105's connection speed). However, in the above example, suppose that media server 101 does not have File A encoded at 56 Kb/s but instead comprises File $A_1$ encoded at 28 Kb/s and File $A_2$ encoded at 112 Kb/s; then upon client 105 requesting the content of File A, media server 101 typically attempts to serve File $A_1$ to client 105, as File $A_1$ is the highest-quality encoded file providing the requested content that is encoded at a suitable bit rate that client 105's connection can support.

Typically, a streaming media player is executed by the requesting client for playing the received stream. Various types of streaming media technologies exist. Popular streaming media players include those provided by RealNetworks™ (see http://www.realnetworks.com), such as its RealPlayer™ and RealOnePlayer™ streaming media players, and that used by Microsoft's Windows® Media Player (see http://www.microsoft.com), as examples. For instance, clients 104, 105, and 106 comprise streaming media players 104A, 105A, and 106A, respectively, executing thereon for playing received streams in the example of FIG. 1. Typically, each streaming media player has a buffer associated therewith, such as buffers 104B, 105B, and 106B shown in the example of FIG. 1, for buffering received streamed data to improve the continuity of the playback of such streamed data by the streaming media player.

As an example of a typical scenario for a user accessing an audio stream via the web, the user will typically use a web browser, such as Netscape's Navigator™, Microsoft's Internet Explorer™, or other web browser now known or later developed, to request access to audio content (e.g., a RealPlayer sound clip) by, for example, clicking a link to such audio content provided on a web page being served by a web server. Assuming, for instance, that the requested audio content is included in a RealPlayer sound file, the web server sends back to the browser a file called a RealPlayer metafile, which is a small text file that has the true location (e.g., the Universal Resource Locator (URL)) of the requested RealPlayer sound file and also has instructions instructing the web browser to launch the RealPlayer sound player. For instance, client 104 may submit request 107 for desired streaming audio content by, for example, clicking on a hyperlink to such streaming audio content. If a suitable streaming media player 104A (e.g., a RealPlayer media player in the above example) is not already executing on client 104, media server 101 may return instructions launching such streaming media player 104A.

The streaming media player 104A contacts the URL contained in the received metafile. It should be recognized that often the URL contacted for accessing the desired audio stream is not on the web server from which the audio file was requested. Rather, the audio stream is often on a different media server (e.g., a RealPlayer server in the above example) designed to deliver streaming media files. For instance, in FIG. 1, client 104 may access a web server (not shown) and a user may click on a hyperlink provided on a web page being served by such web server to request desired audio content. The web server may return a metafile to the client indicating the URL of the corresponding sound file and launching streaming media player 104A if it is not already executing. The URL of the sound file may identify media server 101, which is designed for delivering streaming media files, such as those stored to data storage 102, and streaming media player 104A may therefore contact media server 101 (via request 107 in this example).

Media server 101 (e.g., a RealPlayer server in this example) and streaming media player 104A (e.g., a RealPlayer media player in this example) may interact with each other so that the server knows at what speed client 104 is connected to the Internet. If the connection is a low-speed connection, a streaming audio file encoded at a lower bit rate is typically sent. This will generally be a file of lesser quality than a file encoded at a higher bit rate and destined for a high-speed connection. If a high-speed connection is used, a larger, higher-quality sound file encoded at a higher bit rate is typically sent, which will generally provide for better sound quality. The requested audio file is then sent in Internet Protocol (IP) packets, typically using either the User Datagram Protocol (UDP) or the Internet's normal Transmission Control Protocol (TCP). UDP does not keep re-sending packets if they are misplaced or other problems occur, as does TCP, which may be preferable for certain streaming media technologies.

Thus, media server 101 serves the requested audio content to client 104 as stream 108. The packets are sent to buffer 104B on client 104, and once the buffer is filled, the packets begin being sent from the buffer to streaming media player 104A and it begins playing the audio file. As the file is being played remaining portions of the file are still transmitted from media server 101 to client 104 and are buffered in buffer 104B. If packets are not replenished to buffer 104B fast enough, then interruptions in the playback by the streaming media player 104A may occur, thus degrading the quality of the audio stream perceived by the user.

Steaming video may be communicated from media server 101 to a client in a similar manner as that described above for streaming audio. For instance, client 105 may submit request 109 for desired streaming video content. The requested video file is then sent in IP packets, typically using UDP. Thus, media server 101 serves the requested video file to client 105 as stream 110. The packets are sent to buffer 105B, and once the buffer fills up, the video begins being played by streaming media player 105A. As the file is being played, remaining video packets of the file are still transmitted from media server 101 to client 105 and are buffered in buffer 105B. If packets are not replenished to buffer 105B fast enough, then interruptions in the playback by streaming media player 105A may occur, thus degrading the quality of the video stream perceived by the user. Once all of the video data has been received and played by streaming media player 105A, the video stops. The video file generally does not remain on the client's system, but rather each section of the file is typically discarded after it is played.

As further shown in FIG. 1, client 106 may request streaming media content (e.g., a streaming audio and/or video file) from server 101 via request 111, and media server 101 may provide the requested content as stream 112 to client 106.

While three clients are shown in this example, it should be recognized that many more clients may, in certain implementations, be concurrently accessing one or more streaming media files from media server 101. As described above, limits exist as to how many concurrent streams media server 101 can support for a given client population. Thus, it may become desirable to measure the capacity of a media server for supporting workloads applied thereto.

In order to measure the capacity of a media server for supporting a received client request, for example, it may be desirable to determine the impact that servicing such received client request will have on the media server's resources. That is, it may be desirable to determine whether servicing the received client request will impact the media server's memory resources or disk resources. As described further below, embodiments of the present invention provide an access model for modeling accesses of streaming files. Such an access model may be used, for example, in constructing a memory model for modeling the media server's memory, wherein such memory model may be used to determine whether a requested file can be served from the media server's memory or whether such requested file is not present in memory and must be served from the media server's disk.

Further, while a client requests streaming media content in each of the above examples, it should be recognized that in some implementations a streaming media file may be "pushed" from media server 101 to a client without the client specifically requesting such file. For instance, upon a client visiting a particular web page, the web page may cause a streaming media file (e.g., an advertisement) to be sent to the client. It should be understood that embodiments of the present invention are applicable to any such utilization of streaming media.

While examples of streaming media technologies, such as typical techniques for accessing RealPlayer streaming media files, are described above, it should be recognized that the present invention is not limited to a specific type of streaming media technology. Further, while examples of streaming audio and streaming video files are described above, the present invention is not limited solely to such types of streaming media, but rather any type of streaming file is intended to be within the scope of the present invention.

There are different types of media servers available in the art. Examples of known media servers include RealNetwork™ Server 8, Windows™ Media Server, QuickTime™ Streaming Server available from Apple Computer, Inc. In servicing client requests, some media servers, such as early versions of the Windows™ Media Server, completely bypass memory. However, many media servers, such as RealNetwork™ Server 8 use the system's memory in servicing client requests. For instance, many media servers use the native operating system file buffer cache support for buffering recently accessed portions of files being served to clients. Files available in memory can generally be accessed more efficiently than those stored to disk. If the file is not available in memory, then the media server accesses its disk to retrieve the file. As the file (or currently needed portion thereof) is retrieved from disk, it is stored to memory and served to the requesting client. In this manner, many media servers use the system's memory (e.g., native operating system file buffer cache support) for buffering recently accessed portions of files being served to clients to enable later accesses to those portions of files that are stored to memory to be served more efficiently by the media server. Certain embodiments of the present invention may be used for modeling the memory of such media servers that make use of memory for buffering recently accessed portions of files being served to clients.

Co-pending U.S. patent application Ser. No. 10/306,279 filed Nov. 27, 2002 entitled "SYSTEM AND METHOD FOR MEASURING THE CAPACITY OF A STREAMING MEDIA SERVER," the disclosure of which is hereby incorporated herein by reference, discloses a set of benchmarks for measuring the basic capacities of streaming media systems. The benchmarks allow one to derive the scaling rules of server capacity for delivering media files which are: i) encoded at different bit rates, and ii) streamed from memory versus disk. As U.S. patent application Ser. No. 10/306,279 titled "SYSTEM AND METHOD FOR MEASURING THE CAPACITY OF A STREAMING MEDIA SERVER" further describes, a "cost" function can be derived from the set of basic benchmark measurements. This cost function may provide a single value to reflect the combined resource requirement such as CPU, bandwidth, and memory necessary to support a particular media stream depending on the stream bit rate and type of access (e.g., memory file access or disk file access).

Traditional media server solutions do not have a built-in admission control policy (for controlling the admission of new client requests to be serviced by the media server) that can prevent server overload and guarantee a desired quality of service. Instead, traditional media servers continue to admit new client requests upon their receipt by the media server and provide degraded quality of service by sharing the available server resources among the admitted streams (even when the media server's resources are overloaded and unable to support the admitted streams).

Certain admission control strategies have been proposed in the technical literature that propose using the maximum bandwidth a server is capable of delivering as an indicator for admission control. However, as described in U.S. patent application Ser. No. 10/306,279 titled "SYSTEM AND METHOD FOR MEASURING THE CAPACITY OF A STREAMING MEDIA SERVER", the amount of bandwidth a server is capable of delivering is variable and depends on the encoding bit rates of current streams in progress. Another possible approach for admission control strategy is based on a pessimistic model, where a new client request is admitted only if a server has enough resources to deliver this request from the disk. However, media server performance may be 3-5 times higher (depending on disk and file system) when media streams are delivered from memory versus disk. Thus, while the pessimistic admission control strategy provides hard guarantees against server overload, it may lead to significant over-provisioning and inefficient resource usage. Thus, this strategy may indeed be too "pessimistic" because it has been observed that typical media workload has a high degree of reference locality (i.e., a high percent of requests often are accessing a small subset of media files) and exhibit a strong sharing pattern (i.e., accesses to the same file come in "bursts"). Intuitively, in such a workload, most of the accesses to popular files may be served from memory, rather than from disk.

Therefore, in order to provide an efficient admission control mechanism for a streaming media server, it may be desirable to be capable of estimating the cost of a new request acceptance, and hence to be able to determine which segments of the requested file are stored in memory. More specifically, by determining which segments of a requested file are stored in memory, an estimate of consumption of memory versus disk resources of the media server in serving the requested file can be estimated.

An embodiment of the present invention is described further below, wherein for each client request r the following notations are used:

file(r)—the media file requested by r;
duration(r)—the duration of file (r) in seconds;
bitRate (r)—the encoding bit rate of the media file requested by r (in describing this embodiment, it is assumed that files are encoded at constant bit rates);
$t^{start}(r)$—the time when a stream corresponding to request r starts (once r is accepted by the media server);
$t^{end}(r)$—the time when a stream initiated by request r is terminated (in describing this embodiment, non-interactive client sessions are assumed, i.e., duration(r)$\leq t^{end}(r)-t^{start}(r)$).

As an example of the real-time nature of streaming media, let request r be a sequential access to streaming media filed from the beginning of the file. For simplicity, let it be a disk access. Then, after 10 seconds of access r, the content, transferred by a server, corresponds to the initial 10 seconds of the file f. The duration of a transferred file prefix defines the number of bytes transferred from disk to memory and further to the client: in this example, it is assumed to be 10 seconds× bitRate(r). Moreover, the real-time nature of file access in streaming media defines the relative time ordering of streamed file segments in memory. This means that the time elapsed from the beginning of the file (e.g., 0 seconds is used here to denote the file beginning) can be used to describe both: 1) the streamed file segment and 2) the relative timestamps of this file segment in memory.

Figure 2:
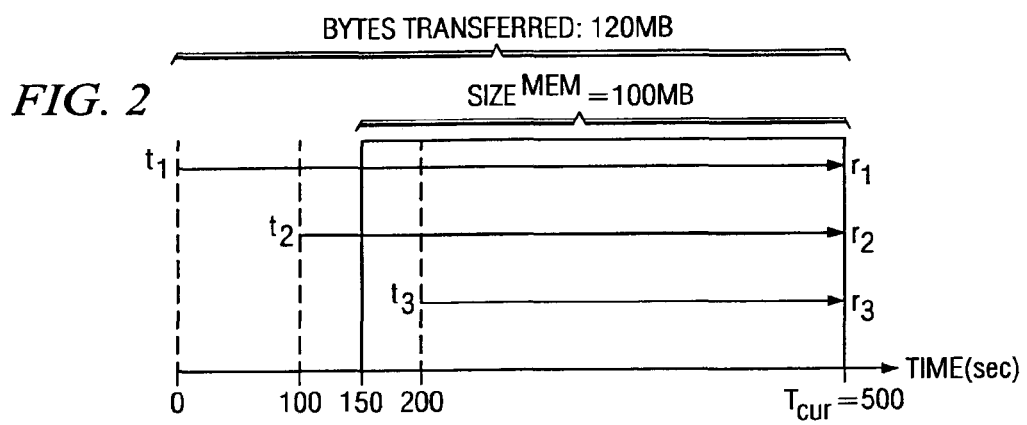
FIG. 2 shows an example of how file segments are stored to memory when concurrent (or overlapping) accesses are made to different media files, given the real-time nature of such media files.

To clarify this point further, FIG. 2 shows an example of how file segments are stored to memory when concurrent (or overlapping) accesses are made to different media files, given the above-described real-time nature of such media files. For the example of FIG. 2, consider a media server that has a 100 MB memory, and the media server has media files $f_1$, $f_2$, and $f_3$ stored thereto, wherein each of such media files $f_1$, $f_2$, and $f_3$ are 600 seconds (10 minutes) long and encoded at 100 KB/s. Let us consider the following sequence of request arrivals as shown in FIG. 2:

request $r_1$ for file $f_1$ arrives at time $t_1$=0 seconds (sec);
request $r_2$ for file $f_2$ arrives at time $t_2$=100 sec;
request $r_3$ for file $f_3$ arrives at time $t_3$=200 sec.

It should be recognized that the time reference shown in FIG. 2 is a "global" time reference across all of the received requests. For instance, request $r_1$ for file $f_1$ arrives at time $t_1$=0 sec, and request $r_2$ for file $f_2$ arrives 100 seconds later at time $t_2$=100 sec. As described further below, the file segments may be designated by their "local" time references. For instance, at time t=150 sec file $f_1$, which began being accessed at time $t_1$=0 sec, is 150 seconds into its stream (which is 600 seconds in duration), and file $f_2$, which began being accessed at time $t_2$=100 sec, is 50 seconds into its stream (which is also 600 seconds in duration).

Let us evaluate the media server's memory state at time point $T_{cur}$=500 sec, shown in FIG. 2. While the overall number of bytes transferred by the three requests is 120 MB, the memory of this example media server can hold only 100 MB of latest (most recent) portions of transferred files which are represented by the following file segments:

a) a segment of file $f_1$ between 150 seconds and 500 seconds of its duration. The denotation <150,500>(150) is used herein to describe this segment, where numbers in "< >" describe the beginning and the end of a file segment, and a number in "( )" defines a relative timestamp (or "global timestamp") in memory corresponding to the beginning of the file segment. That is, the numbers in "< >" describe the "local" timestamp of a file segment by identifying the beginning and the end times of the file segment, and the number in "( )" defines a "global" timestamp for a time reference that is consistent across all requests;

b) a segment of the file $f_2$: <50,400>(150), i.e., the segment of file $f_2$ from 50 seconds to 400 seconds of its duration with the access of such segment starting at the global timestamp of 150 seconds; and c) a segment of the file $f_3$: <0,300>(200), i.e., the segment of file $f_3$ from 0 seconds to 300 seconds of its duration with the access of such segment starting at the global timestamp of 200 seconds.

This new abstraction provides a close approximation of file segments stored in memory and their relative time ordering (timestamps) in memory. That is, for the example of FIG. 2, at time $T_{cur}$=500 sec, the following segments are stored to the media server's memory: file $f_1$<150,500>(150), file $f_2$<50, 400>(150), and file $f_3$<0,300>(200).

The above example of FIG. 2 provides an example of modeling a media server's memory for concurrent accesses (or "overlapping" accesses—i.e., one access beginning before another access ends) to different files $f_1$, $f_2$, and $f_3$. In many instances, the overlapping accesses may be for the same file f. If there are multiple concurrent (or overlapping) accesses to the same file f, then requests with later arrival time might find the corresponding file segments being already in memory. Thus, operations for computing the unique segments of file f with the most recent timestamps which correspond to a sequence of accesses to f may be utilized in an embodiment of the present invention.

In accordance with an embodiment of the present invention, a file segment transferred by request $r^f$ during time interval [T,T'] is defined as follows:

$$\text{segm}(r^f, T, T') = <xy>(\hat{T})$$

where
$x = \max\{T, t^{start}(r^f)\} - t^{start}(r^f)$,
$y = \min\{t^{end}(r^f), T'\} - t^{start}(r^f)$, and
$\hat{T} = \max\{T, t^{start}(r^f)\}$.

In computation of a current memory state, the "unique" file segments currently present in memory are computed. This means that in a case of multiple requests to the same file, the accesses and the corresponding file segments with the latest access time are identified in a manner that avoids repetitively counting of the same bytes accessed by different requests at different time points. Thus, file segments of a model (or data structure) are referred to herein as being "unique" because the corresponding portion of the file of each segment is included in only one of the segments of the model. That is, each segment of the access model represents a unique portion of a file, and as described further below, each segment has associated therewith a corresponding global timestamp that identifies the time at which such segment was last accessed.

As a simple example, suppose a first request $r_1$ is received at global time t=0 see for a file f, which is 100 sec in length. Assuming no other requests are made in the interim, at global time 100 sec the entire file f has been served to the requesting client and saved to the media server's memory. Accordingly, a segment of the memory may be denoted as f<0,100>(0), which identifies that segment <0,100> of file f (the entire file f in this example) is stored to memory having a latest access time of global timestamp t=0 sec. Assume now that at global time t=150 sec a second request $r_2$ for file f is received by the media server. Because file f is available in memory, it can be served to the client from memory. However, the memory segment for file f should now be updated to reflect that it has been more recently accessed. Thus, the data structure modeling such segment may be updated to provide: f<0,100>(150), which identifies that segment <0,100> of file f (the entire file f in this example) is stored to memory having a latest access time of global timestamp t=150 sec. By updating the global timestamp at which the file segment was most recently accessed, a proper determination may be made as to the file segments (or portions thereof) that may be evicted from the media server's memory in accordance with the memory management scheme implemented for the server, such as a Least Recently Used (LRU) scheme, as described further below.

Figure 3:
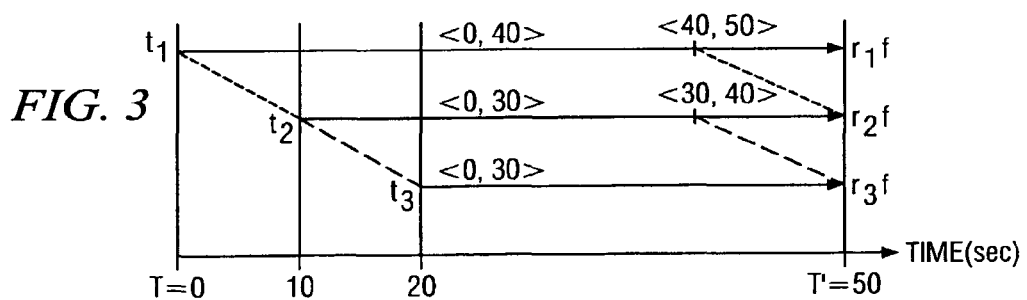
FIG. 3 shows an example in which concurrent (or overlapping) accesses are made to the same file f.

To explain this situation in more detail, attention is now directed to FIG. 3, which graphically depicts an example in which concurrent accesses are made to the same file f. In the example of FIG. 3, let $r_1^f$, $r_2^f$, $r_3^f$ be a sequence of requests accessing the same file f in the following arrival order: $t^{start}(r_1^f)$=0 sec, $t^{start}(r_2^f)$=10 sec, and $t^{start}(r_3^f)$=20 sec. That is, request $r_1^f$ is received at global time T=0 sec, request $r_2^f$ is received at global time T=10 sec, and request $r_3^f$ is received at global time T=20 sec.

By the time T'=50 sec, the first request $r_1^f$ has transferred segment <0,50>(0) of file f, and the initial part of this segment <0,40>(0) is again accessed and transferred at a later time by the second request $r_2^f$. Thus, segment <40,50>(40) is the only "unique" segment of file f accessed by $r_1^f$ most recently. That is, segment <40,50>(40) is the only segment of file f that has been accessed most recently by request $r_1^f$ because other segments of file f accessed by request $r_1^f$ have been more recently accessed by other requests, such as request $r_2^f$.

Similarly, segment <30,40>(40) represents the only unique segment of file f that was accessed most recently by $r_2^f$. More specifically, by the time T'=50 sec, request $r_2^f$ has transferred segment <0,40>(10) of file f, and the initial part of this segment <0,30>(10) is again accessed and transferred at a later time by the third request $r_3^f$. Thus, segment <30,40>(40) is the only unique segment of file f accessed by $r_2^f$ most recently. That is, segment <30,40>(40) is the only segment of file f that has been accessed most recently by request $r_2^f$ because other segments of file f accessed by request $r_2^f$ have been more recently accessed by other requests, such as request $r_3^f$.

Finally, the latest request $r_3^f$ is accountable for the most recent access to the initial segment <0,30>(20) of file f. Thus overall, the unique segments of file f with the most recent timestamps in the global time reference [0, 50]sec interval are the following:

$$\text{segm}(f, 0, 50) = \{<0,30>(20), <30,40>(40), <40,50>(40)\}.$$

In the above denotation, segm(f, 0, 50) identifies that the segment under evaluation is the segment for file f as accessed during the global time reference of 0 sec to 50 sec. In the example of FIG. 3, the resulting segments of file f for this evaluation are $\{<0,30>(20), <30,40>(40), <40,50>(40)\}$, wherein the segment <0,30>(20) corresponds to the portion of file f most recently accessed by request $r_3^f$, the segment <30,40>(40) corresponds to portion of file f most recently accessed by request $r_2^f$, and the segment <40,50>(40) corresponds to portion of filed most recently accessed by request $r_1^f$. Accordingly, the above segm(f, 0, 50) provides an example of a segment-based access model (or data structure) of streaming file f.

To determine the unique, most recent segments of file f accessed by subsequent requests $r_{i_1}^f$ and $r_{i_2}^f$ in [T,T'] time interval, a new operation called "segments subtraction" and denoted as "\" is introduced herein. Let $r_{i_1}^f$ and $r_{i_2}^f$ be two subsequent requests accessing the same file f such that $t^{start}(r_{i_1}^f) \leq t^{start}(r_{i_2}^f)$, i.e. $r_{i_2}^f$ is more recent access than $r_{i_1}^f$. Let $\text{segm}_{i_1} = \text{segm}(r_{i_1}^f, T, T') = <x_{i_1}, y_{i_1}>(T_{i_1})$ and $\text{segm}_{i_2} = \text{segm}(r_{i_2}^f, T, T') = <x_{i_2}, y_{i_2}>(T_{i_2})$. Then $$segm_{i_1} \setminus segm_{i_2} = \begin{cases} \langle x_{i_1}, y_{i_1} \rangle (T_{i_1}) & \text{if } y_{i_2} \leq x_{i_1} \\ \langle y_{i_2}, y_{i_1} \rangle (T'_{i_1}) & \text{otherwise} \end{cases} \quad (1)$$

where $T_{i_1}' = T_{i_1} + (y_{i_2} - x_{i_2})$.

Intuitively, operation ($segm_{i_1} \setminus segm_{i_2}$) tries to define a part of older segment $segm_{i_1}$, which does not coincide with any part of more recent segment $segm_{i_2}$. Accordingly, this operation results in determination of "unique" file segments that have been accessed.

Now, let $r_1^f, r_2^f, \ldots, r_n^f$ be a sequence of requests accessing the same file f during [T,T'] interval, where $t^{start}(r_1^f) \leq t^{start}(r_2^f) \leq \ldots \leq t^{start}(r_n^f)$, i.e. $r_1^f$ is the oldest access and $r_n^f$ is the most recent access to file f in [T,T'] interval. It is desirable to compute the unique segments of file f with the most recent timestamps which correspond to requests $r_1^f, r_2^f, \ldots f_n^f$ during time interval [T,T']. The general formula to compute such file segments is defined in the following way:

$$segm(f, T, T') = \bigcup_{i=1}^{n} (segm(r_i^f, T, T') \setminus segm(r_{i+1}^f, T, T')) \quad (2)$$

where $segm(r_{n+1}^f, T, T') = <0,0>(0)$, i.e. a "zero" size segment. If $r^f$ is the only request accessing file f during [T,T'] interval then $segm(f,T,T') = segm(r^f,T,T')$.

As a further illustrative example, let $segm(f,T,T') = \{<x_1, y_1>(T_1), \ldots, <x_n, y_n>(T_n)\}$. Note that the set of segments $segm(f,T,T')$ can be ordered in two different ways: 1) according to file f's structure and/or 2) according to their timestamps, as described further hereafter. The first ordering technique is referred to as "file structure ordering of the segments," in which the segments are ordered according to file f's structure. In an embodiment of the present invention, the segments are ordered according to file f's structure if for any two consecutive segments $<x_i,y_i>(T_i)$ and $<x_{i+1}, y_{i+1}>(T_{i+1})$ the following condition holds: $y_i \leq x_{i+1}, 1 \leq i \leq n-1$. This representation conveniently reflects which segments of file f were accessed during the time interval [T,T']. To distinguish this file structure ordering, the denotation $segm_{order}^{file}(f,T,T')$ is used herein.

The second ordering technique is referred to as "timestamp ordering of segments" (or "memory ordering of segments"), in which the segments are ordered according to their timestamps. In an embodiment of the present invention, the segments are ordered according to their timestamps if for any two consecutive segments $<x_i,y_i>(T_i)$ and $<x_{i+1},y_{i+1}>(T_{i+1})$ the following condition holds: $T_i \leq T_{i+1}, 1 \leq i \leq n-1$. This representation conveniently reflects the time ordering of accessed file segments during the time interval [T,T']. To distinguish time ordering, the denotation $segm_{order}^{time}(f,T,T')$ is used herein.

Figure 4:
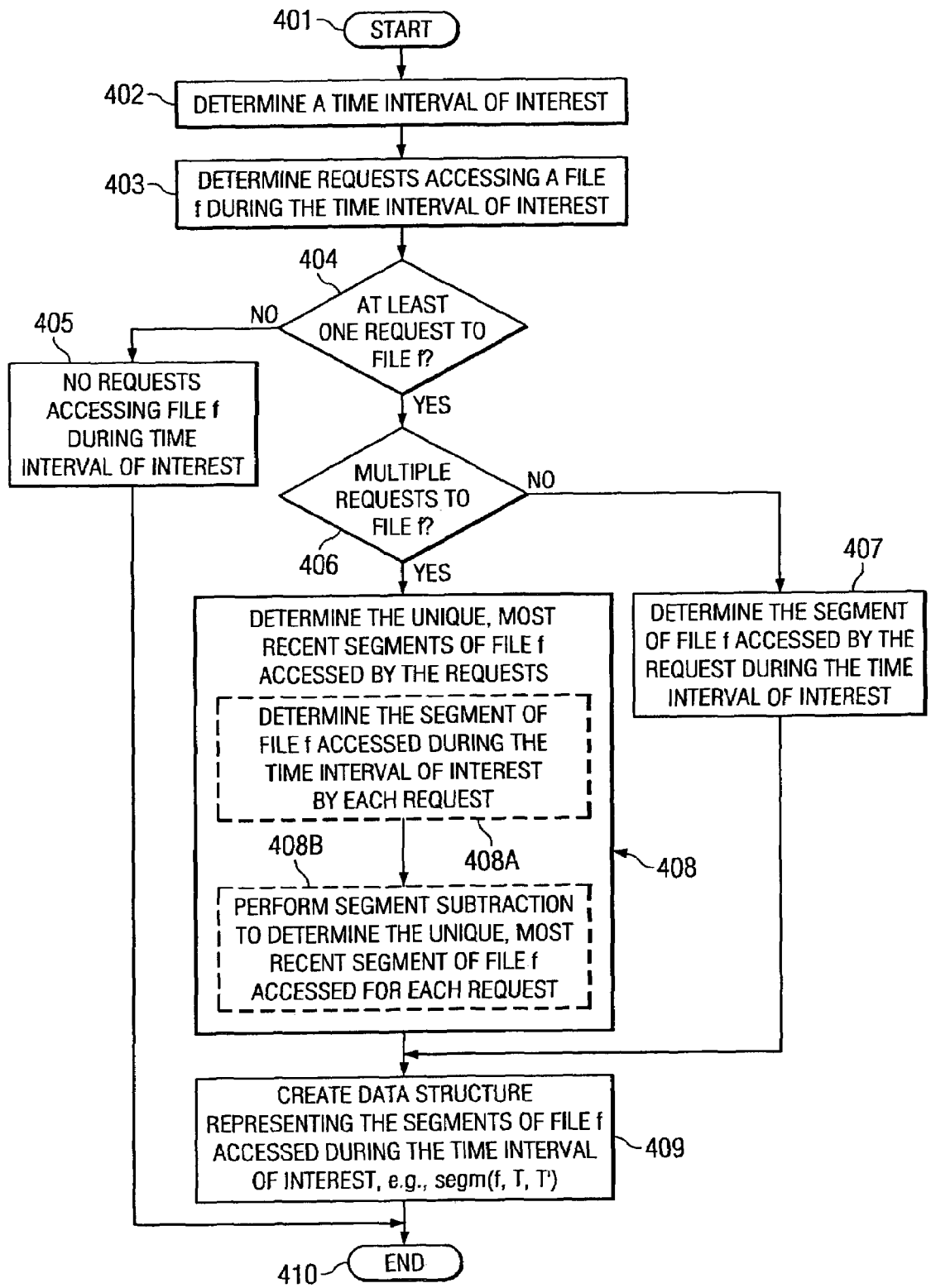
FIG. 4 shows an example operational flow diagram for determining a data structure that represents the "unique" segments of a file that were accessed during a time interval of interest in accordance with an embodiment of the present invention.

The above-described computations may be used to create a novel segment-based memory model, which can be used to efficiently evaluate file segments stored in memory. More specifically, the above-described computations can be used to create data structures representing segments of a file accessed by one or more requests during a given time interval of interest. For instance, FIG. 4 shows an example operational flow diagram for determining a data structure that represents the "unique" segments of a file that were accessed during a time interval of interest in accordance with an embodiment of the present invention. In certain embodiments, access modeling logic, which may comprise hardware, software, or any combination thereof, may be implemented to perform the example operations of FIG. 4 for creating a segment-based access model for one or more streaming files served by a media server. Operation starts in operational block 401, and in operational block 402 a time interval of interest is determined. For instance, a user or an application, such as an admission control application, may specify a time interval of interest. In operational block 403, the requests accessing a file f during the time interval of interest are identified. That is, the requests for file f received by the media server during the time interval of interest are identified.

In block 404, it is determined whether at least one request was made for file f during the time interval of interest. If not, then it is determined that there were no requests made for file f during the time interval of interest in block 405 and operation ends at block 410.

If it is determined in block 404 that at least one request was made for file f during the time interval of interest, operation advances to block 406 whereat it is determined whether multiple requests were made for file f during the time interval of interest. If not, then the segment of file f accessed by the single request during the time interval of interest is determined in block 407—recall from above that if $r^f$ is the only request accessing file f during [T,T'] interval then $segm(f,T,T') = segm(r^f,T,T')$, and operation advances to block 409, which is described further below.

If it is determined in block 406 that multiple requests accessed file f during the time interval of interest, operation advances to block 408 whereat the unique, most recent segments of file f accessed by the requests are determined. For instance, in the example of FIG. 3, a time interval from 0 seconds to 50 seconds is of interest (i.e., [0,50]), and requests $r_1^f, r_2^f, r_3^f$ are identified as being made for file f during such time interval. As described above, the unique, most recent segments of file f accessed by requests $r_1^f, r_2^f, r_3^f$ in the example of FIG. 3 are $\{<40,50>(40), <30,40>(40), <0,30>(20)\}$. Again, these segments are referred to herein as being "unique" because the corresponding portion of the file of each segment is included in only one of the segments of the access model (or data structure). That is, each segment represents a unique portion of file f and as described above, each segment has associated therewith a corresponding global timestamp that identifies the time at which such segment was last accessed.

As shown in the example of block 408, in certain embodiments blocks 408A and 408B may be performed for determining the unique, most recently accessed segments of file f. In block 408A, the segment of file f accessed during the time interval of interest by each request is determined. For instance, in the example of FIG. 3, a segment $<0,50>(0)$ is accessed by request $r_1^f$, a segment $<0,40>(10)$ is accessed by request $r_2^f$, and segment $<0,30>(20)$ is accessed by request $r_3^f$ during the time interval [0,50].

In block 408B, segment subtraction is performed to determine the unique, most recently accessed segments of file f. For instance, in the example of FIG. 3, segment subtraction is performed, and it is determined that the unique, most recent segments of file f accessed by requests $r_1^f, r_2^f, r_3^f$ are $\{<40, 50>(40), <30,40>(40), <0,30>(20)\}$. As described above, the unique segments of file f with the most recent timestamps corresponding to requests $r_1^f, r_2^f, \ldots r_n^f$ during a time interval [T,T'] of interest may be computed using the formula:

$$segm(f, T, T') = \bigcup_{i=1}^{n} \left(segm(r_i^f, T, T') \setminus segm(r_{i+1}^f, T, T')\right) \quad (2)$$

where $segm(r_{n+1}^f, T, T') = <0,0>(0)$, i.e. a "zero" size segment.

In operational block 409, a data structure representing the segments of file f accessed during the time interval of interest (e.g., segm(f,T,T')) is created. For instance, continuing with the example of FIG. 3, a data structure segm(f,0,50)={<40, 50>(40), <30,40>(40), <0,30>(20)} is created. As described above, in certain embodiments, the segments of segm(f,T,T') may be ordered in either of two different ways: 1) according to file f's structure or 2) according to the segments' respective timestamps. Operation may then end in block 410.

As described with FIG. 4 above, data structures may be created that represent the unique, most recently accessed segments of a file for accesses occurring during a time interval of interest. In accordance with an embodiment of the present invention, such data structures may be used to compute (or model) the current memory state of a media server. As an example, suppose a media server has files $f_1$, $f_2$, $f_3$, $f_4$, and $f_5$ stored thereto, which are each encoded at the same bit rate (e.g., 56 Kb/s). Further suppose that the files have the following durations: $f_1$=45 sec duration, $f_2$=200 sec duration, $f_3$=360 sec duration, $f_4$=240 sec duration, and $f_5$=100 sec duration. The above-described modeling technique may be performed to create a segment-based access model for each file. For instance, a segment-based access model may be created for each of files $f_1$-$f_5$ based on accesses to those files during the time interval [0,5000] (i.e., from global timestamp 0 sec through global timestamp 5000 sec). The resulting segment-based access models that may be created for each of the files in this example are as follows:

segm($f_1$, 0, 5000)={<0,40>(4960), <40,45>(4995)};
segm($f_2$, 0, 5000)={<0,200>(270)};
segm($f_3$, 0, 5000)={<0,360>(4500)};
segm($f_4$, 0, 5000)={<0,240>(3560)}; and
segm($f_5$, 0, 5000)={<0,100>(1025)}

Thus, a segment-based access model (or data structure) is constructed for each of the files $f_1$-$f_5$ that identifies unique, most recently accessed segments of each file during the time interval [0,5000]. As can be seen in the above segment-based access model for file $f_1$, its segment <0,40> was last accessed starting at time 4960 sec and its segment <40,45> was last accessed starting at time 4995 sec. From the segment-based access model of file $f_2$, it can be seen that its entire file (i.e., segment <0,200>) was last accessed starting at time 270 sec. From the segment-based access model of file $f_3$, it can be seen that its entire file (i.e., segment <0,360> was last accessed starting at time 4500 sec. From the segment-based access model of filed $f_4$, it can be seen that its entire file (i.e., segment <0,240>) was last accessed starting at time 3560 sec. Finally, from the segment-based memory model of file $f_5$, it can be seen that its entire file (i.e., segment <0,100>) was last accessed starting at time 1025 sec.

Suppose now that the media server's memory has a size that is capable of storing up to 400 seconds of the streaming media files (i.e., memory size=400 seconds×56 Kb/s=22400 Kb in this example), the above segment-based access models may be useful in determining the data stored to the media server's memory at time t=5000 sec. For simplicity, this example assumes that all of the files have the same encoding bit rate. Of course, in many streaming media applications the streaming media files may have different encoding bit rates, and thus the amount memory consumed by an access to any such file may be determined as a function of the duration of the file access and the file's encoding bit rate (e.g., memory consumed for an access=file access duration×file encoding bit rate). In this example, all of files $f_1$-$f_5$ cannot be stored in full to the media server's memory because the sum of the bytes accessed for such filed $f_1$-$f_5$ (i.e., 945 sec×56 Kb/s encoding rate=52920 Kb in this example) exceeds the total bytes capable of being stored to the media server's memory (i.e., 22400 Kb in this example). Thus, it may be desirable to know the content of the media server's memory at time t=5000 (i.e., it may be desirable to know the portions of files $f_1$-$f_5$ that are stored to the media server's memory at time t=5000).

With knowledge regarding the media server's memory management scheme, the above segment-based access model of files $f_1$-$f_5$ may be used to determine the state of the media server's memory at time t=5000. For instance, typically a media server's memory is managed in accordance with an LRU scheme, wherein the most recently accessed segments of files are stored to memory and the oldest (or least recently) accessed segments of files are evicted when needed to make room in memory for storing more recently accessed files. Assuming such an LRU scheme is followed for the above example, the state of the media server's memory at time t=5000 can be determined using the segment-based access models of files $f_1$-$f_5$. For instance, from the above segment-based access models of files $f_1$-$f_5$, it can be seen that portions <40,45> and <0,40> of file $f_1$ were most recently accessed, i.e., at times 4995 sec and 4960 sec respectively. Thus, file $f_1$ having a duration of 45 sec is included in the media server's memory at time 5000 sec in this example.

The next most recent file segment accessed in the above example was the entire file $f_3$ (i.e., segment <0,360>) which was accessed at time 4500 sec. File $f_3$ has a total duration of 360 sec, while the duration of file $f_1$ is 45 sec. Thus, the sum duration of files $f_3$ and $f_1$ is 405 sec. Because each of the files are assumed in this example to have an encoding bit rate of 56 Kb/s, the entire 405 sec duration of files $f_1$ and $f_3$ exceeds the media server's memory. Thus, the entire 300 sec duration of file segment <0,300> of file $f_3$ cannot be stored to the media server's memory, but rather only the most recent 295 sec of such segment is stored to the media server's memory. The remainder of such segment, as well as the least recently accessed segments of files $f_2$, $f_4$, and $f_5$, would have been evicted from memory in order to store the more recent accesses in accordance with the LRU management scheme. Thus, the portion of segment <0,300> of file $f_3$ that would remain in memory is <5,300>(4505)—it should be noted that the timestamp for the access of this segment is 4505 sec. Thus, the resulting contents of the media server's memory in the above example would be as follows:

memory state={$f_1$<40,45>(4995), $f_1$<0,40>(4960), $f_3$<5,30>(4505)}.

Computing the current memory state may be described as follows: let $Size^{mem}$ be the size of a media server's memory in bytes and let $r_1(t_1), r_2(t_2), \ldots, r_k(t_k)$ be a recorded sequence of requests to the media server; given the current time T, some past time $T^{mem}$ is computed such that the sum of the bytes stored in memory between $T^{mem}$ and T is equal to $Size^{mem}$. In this manner, the files' segments streamed by the media server between times $T^{mem}$ and T will be in the media server's memory. By modeling the current state of the media server's memory, an intelligent determination of the server's resources that will be utilized to service a newly received client request can be made. That is, an intelligent determination can be made as to whether a newly received client request can be serviced from the media server's memory or whether the received client request will require access to the media server's disk. An example of computing a current memory state of a media server in accordance with an embodiment of the present invention is described further below in conjunction with FIG. 5.

Figure 5:
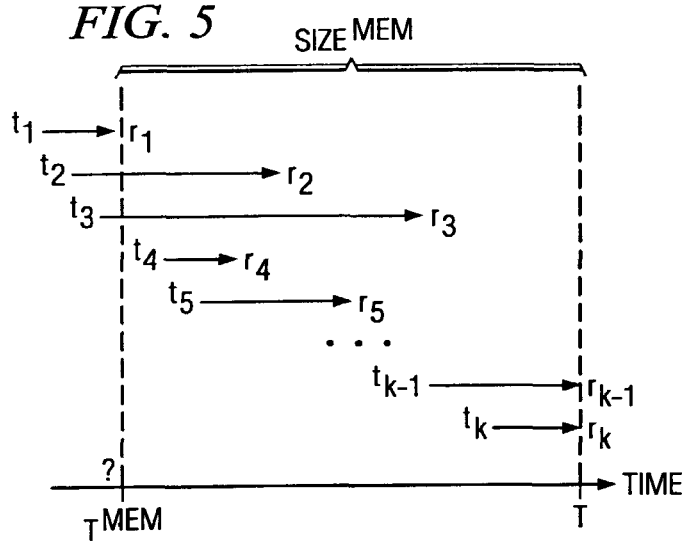
FIG. 5 shows an example of requests for file accesses that are made to a media server during the interval of time $t_1$ through time T, wherein the interval from time $T^{mem}$ through time T can be determined that comprises the segments of accessed files that are currently stored to the media server's memory, which has size $Size^{mem}$.

Turning to FIG. 5, an example of requests for file accesses that are made to a media server during the interval of time $t_1$ through time T is shown, wherein the interval from time $T^{mem}$ through time T can be determined that comprises the segments of accessed files that are currently stored to the media server's memory, which has size $Size^{mem}$. More specifically, accesses $r_1, r_2, \ldots, r_{k-1}, r_k$ are made during the time interval from time $t_1$ through the current time T. As shown in the example of FIG. 5, the total size of the segments accessed is greater than the total size $Size^{mem}$ of the media server's memory. Thus, depending on the type of memory management scheme implemented for the memory, some of the accessed segments are evicted from the memory. That is, not all of the accessed segments can be stored to memory because the segments' total size is greater than the size $Size^{mem}$ of memory. Typically, a LRU scheme is implemented for a media server, wherein the most recently accessed segments are stored to memory and the oldest (or least recently accessed), segments are evicted when necessary to make room for more recently accessed segments to be stored in memory. To determine the current contents of memory, the time interval from time $T^{mem}$ to the current time T in which unique file segments that have a size totaling size $Size^{mem}$ is determined.

Because, as described above, the function $segm(f, T^{mem}, T)$ represents the unique segments of file f accessed in $[T^{mem}, T]$ interval, the total amount of unique bytes of file f accessed and stored in memory between $[T^{mem}, T]$ interval can be computed, and such total amount is denoted herein as UniqueBytes$(f, T^{mem}, T)$.

In view of the above, embodiments of the present invention may be utilized to model accesses to streaming files. More specifically, embodiments of the present invention may be utilized to create a segment-based access model for a streaming file that identifies: (1) unique segment(s) of the streaming file (e.g., unique, sequential portions of the streaming file) that were accessed by a client during a time interval of interest, and (2) identification of the corresponding timestamp of the most recent access of each unique segment. Such a segment-based access model may be used, for example, in constructing a segment-based memory model of a media server's memory. Such a memory model may be used, for example, in implementing an admission control policy for the media server for managing the acceptance of client requests to be serviced by the media server (e.g., to ensure optimal resource utilization and/or a desired level of quality of service). For instance, the memory of a media server may be modeled during its runtime, and such memory model may be utilized for measuring the capacity of the media server in supporting actual workloads applied thereto by a population of clients. For example, the capacity of the media server may be measured in accordance with the teachings of co-pending U.S. patent application Ser. No. 10/306,279 titled "SYSTEM AND METHOD FOR MEASURING THE CAPACITY OF A STREAMING MEDIA SERVER," using the memory model for determining the current memory state of the media server. Thus, when actually implemented in a client-server network, a media server's capacity (e.g., its available capacity) may be monitored for supporting actual workloads applied thereto using a derived cost function, as described in co-pending U.S. patent application Ser. No. 10/306,279 titled "SYSTEM AND METHOD FOR MEASURING THE CAPACITY OF A STREAMING MEDIA SERVER." This is particularly attractive in systems in which resources may be dynamically allocated, such as in Utility Data Centers (UDCs), for supporting the applied workloads.

Figure 6:
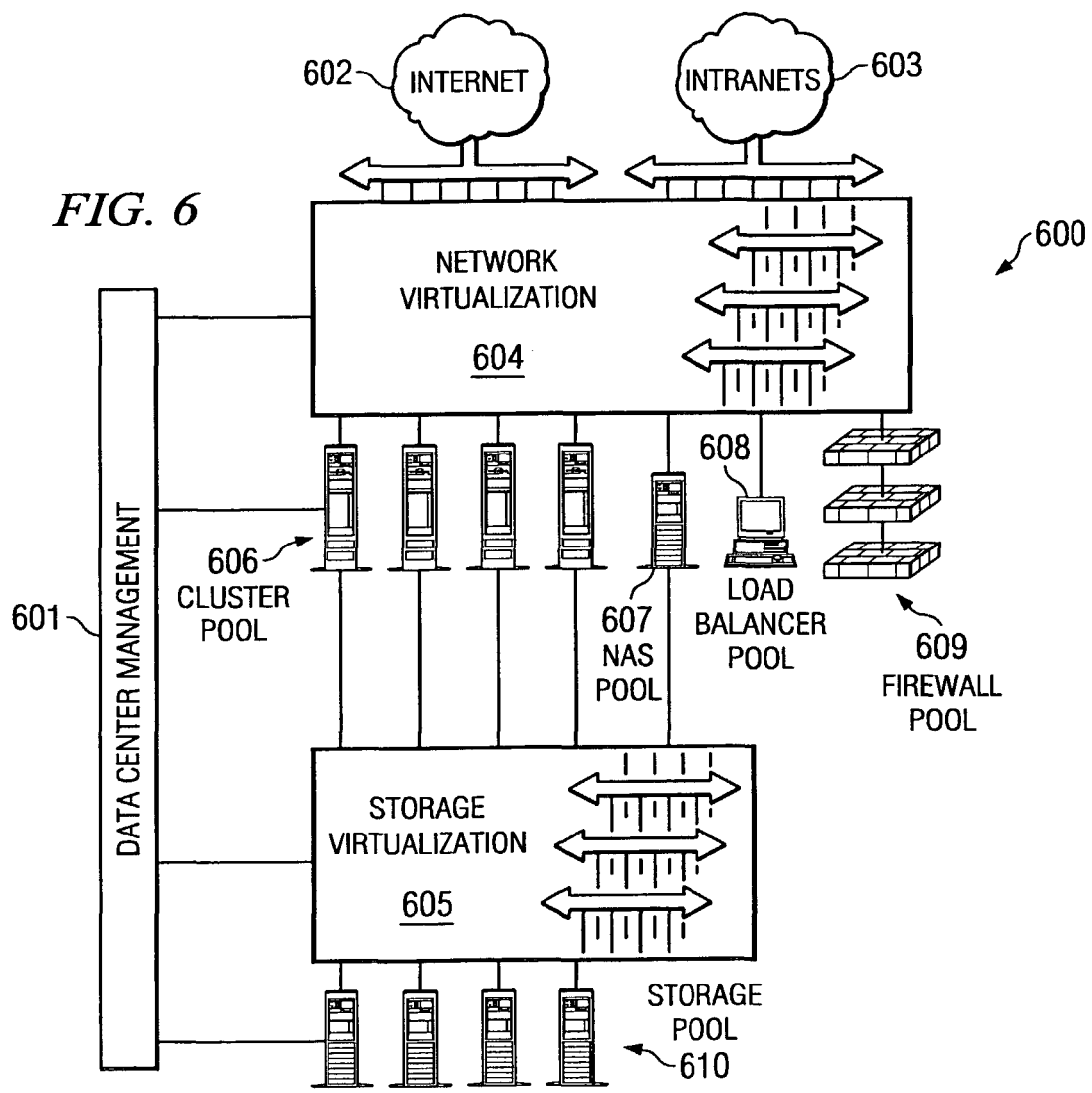
FIG. 6 shows an example Utility Data Center arrangement in which resources may be dynamically allocated and in which certain embodiments of the present invention may be implemented.

For instance, FIG. 6 shows an example UDC 600 in which resources may be dynamically allocated. Such a UDC 600 may be used for implementing a media server complex in which resources are dynamically allocated for the media server responsive to the workload applied thereto in accordance with the measured capacity of the media server. Implementations of UDC 600 are known in the art and therefore UDC 600 is only briefly described herein. As shown in FIG. 6, UDC 600 comprises data center management logic 601 that is operable to manage the allocation of resources in UDC 600. UDC 600 is coupled to a communications network, such as the Internet 602 and/or Intranets 603, thus enabling access by clients (not shown) via such communication networks. Network virtualization logic 604 and storage virtualization logic 605 is also included. UDC 600 further comprises cluster pool 606, network-attached storage (NAS) pool 607, load balancer pool 608, firewall pool 609, and storage pool 610. Again, data center management logic 601 is operable to manage the allocation of resources, such as resources available in cluster pool 606, NAS pool 607, and storage pool 610. Thus, by modeling the current memory state of a media server in accordance with embodiments of the present invention and using such memory state for computing a cost function for measuring the capacity of the media server complex under an applied workload as described in co-pending U.S. patent application Ser. No. 10/306,279 titled "SYSTEM AND METHOD FOR MEASURING THE CAPACITY OF A STREAMING MEDIA SERVER," data center management logic 601 may, responsive to the measured capacity, dynamically allocate the appropriate resources for supporting the applied workload.

When implemented via computer-executable instructions, various elements of embodiments of the present invention for modeling a media server's memory are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

FIG. 7 illustrates an example computer system 700 adapted according to embodiments of the present invention. That is, computer system 700 comprises an example system on which embodiments of the present invention may be implemented. Central processing unit (CPU) 701 is coupled to system bus 702. CPU 701 may be any general purpose CPU. The present invention is not restricted by the architecture of CPU 701 as long as CPU 701 supports the inventive operations as described herein. CPU 701 may execute the various logical instructions according to embodiments of the present invention. For example, CPU 701 may execute machine-level instructions according to the example operational flow described above in conjunction with FIG. 4. For instance, example computer system 700 may comprise a media server for implementing the above-described operations of an embodiment of the present invention, or example computer system 700 may comprise an admission controller (or access modeling logic) that is included in a media server or is communicatively coupled to a media server for implementing the above-described operations of an embodiment of the present invention, as examples.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information thereto.

I/O adapter 705 preferably connects storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for application programs. Communications adapter 711 is preferably adapted to couple computer system 700 to network 712 (e.g., network 103 of FIG. 1).

User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710.

It shall be appreciated that the present invention is not limited to the architecture of system 700. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method for modeling accesses of a streaming media file, the method comprising:
    determining, for a time interval of interest, at least one unique segment of a streaming media file accessed during said time interval of interest by at least one client; and
    creating a data structure representing the determined at least one unique segment of said streaming media file, the data structure created as a segment-based data structure having at least one data structure segment corresponding to the at least one unique segment of said streaming media file.

2. The method of claim 1 wherein each of said at least one unique segment comprises a sequential portion of said streaming media file.

3. The method of claim 2 wherein said data structure includes a timestamp for each of said at least one unique segment that identifies a time corresponding to a most recent access of said sequential portion.

4. The method of claim 1 wherein said data structure includes corresponding timestamp of access for each of said at least one segment.

5. The method of claim 1 wherein said determining at least one unique segment comprises:
    determining if multiple accesses were made to said streaming media file during said time interval of interest; and
    if multiple accesses were made to said streaming media file during said time interval of interest, then determining from the multiple accesses said at least one unique segment of said streaming media file.

6. The method of claim 1 wherein said determining at least one unique segment comprises:
    identifying, for said time interval of interest, at least one request received at a server for accessing said streaming media file;
    for each of said at least one request, determining a segment of said streaming media file accessed during the time interval of interest; and
    if multiple requests are identified for said streaming media file during said time interval of interest, then determining, from the determined segments of said streaming media file accessed by each of said multiple requests, said at least one unique segment of said streaming media file that was most recently accessed within said time interval of interest.

7. The method of claim 6 wherein said determining said at least one unique segment comprises:
    if multiple requests are identified, performing segment subtraction between the determined segments of said streaming media file accessed by the multiple requests.

8. The method of claim 1 further comprising:
    determining from said data structure content of memory of a server from which the streaming media file was served.

9. A method for modeling accesses of a streaming file from a server, the method comprising:
    identifying, for a time interval of interest, at least one request received at a server for accessing a streaming file;
    for each of said at least one request, determining a segment of said streaming file accessed during the time interval of interest; and
    if multiple requests are identified for said streaming file during said time interval of interest, then determining, from the determined segments of said streaming file accessed by each of said multiple requests, at least one unique segment of said streaming file that was most recently accessed within said time interval of interest.

10. The method of claim 9 wherein said determining at least one unique segment of said streaming file that was most recently accessed within said time interval of interest comprises:
    performing a segment subtraction operation between the determined segments of said streaming file accessed by each of said multiple requests.

11. The method of claim 9 further comprising:
    creating a data structure representing the determined at least one unique segment of said streaming file that was most recently accessed within said time interval of interest.

12. The method of claim 11 further comprising:
    maintaining said data structure for a plurality of streaming files available on said server.

13. The method of claim 9 further comprising:
    determining corresponding timestamp of a most recent access during said time interval of interest of each of said determined at least one unique segment of said streaming file.

14. The method of claim 13 further comprising:
creating a data structure representing the determined at least one unique segment of said streaming file, wherein said data structure associates each of the at least one unique segment of said streaming file with its corresponding timestamp of its most recent access during said time interval of interest.

15. The method of claim 9 further comprising:
for each of a plurality of streaming files available from said server
   (a) identifying, for said time interval of interest, at least one request received at said server for accessing the streaming file,
   (b) for each of said at least one request, determining a segment of the streaming file accessed during the time interval of interest, and
   (c) if multiple requests are identified for the streaming file during said time interval of interest, then determining, from the determined segments of the streaming file accessed by each of those multiple requests, at least one unique segment of the streaming file that was most recently accessed within said time interval of interest.

16. The method of claim 9 further comprising:
if only one request is identified for said streaming file during said time interval of interest, then determining a segment of said streaming file accessed by said one request as being a unique segment of said streaming file that was most recently accessed within said time interval of interest.

17. A system comprising:
a media server to serve at least one streaming file to clients communicatively coupled thereto; and
access modeling logic to create a data structure for modeling accesses of said at least one streaming file during a time interval of interest by at least one of said clients, wherein said data structure includes, for each of said at least one streaming file accessed during said time interval of interest, information identifying at least one unique segment of the streaming file and information identifying a timestamp for each of said at least one unique segment corresponding to the most recent access of the segment during said time interval of interest.

18. The system of claim 17 wherein said access modeling logic is to:
   (a) identify, for said time interval of interest, at least one request received at said media server from a client for accessing one of said at least one streaming file,
   (b) determining, for each of said at least one request received at said media server, a segment of said streaming file accessed by the request, and
   (c) if multiple requests are identified for said streaming file during said time interval of interest, then determining, from the determined segments of said streaming file accessed by each of said multiple requests, said at least one unique segment of said streaming file.

19. The system of claim 18 wherein said access modeling logic is further to determine corresponding timestamp of the most recent access of each of said determined at least one unique segment of said streaming file.

20. The system of claim 17 wherein said access modeling logic is further to maintain said data structure for a plurality of streaming files available on said media server.

21. The system of claim 17 wherein said access modeling logic is further to:
for each of a plurality of streaming files available from said media server
   (a) identify, for said time interval of interest, at least one request received from a client at said media server for accessing the streaming file,
   (b) for each of said at least one request, determine a segment of the streaming file accessed by such request, and
   (c) if multiple requests are identified for the streaming file during said time interval of interest, then determine, from the determined segments of the streaming file accessed by each of those multiple requests, at least one unique segment of the streaming file that was most recently accessed within said time interval of interest.

22. The system of claim 17 wherein each of said at least one unique segment comprises a sequential portion of the streaming file.

23. The system of claim 17 wherein said access modeling logic comprises software code stored to a computer-readable medium.

24. Computer-executable software code stored to a computer-readable medium, the computer-executable software code comprising:
code for identifying, for a time interval of interest, at least one request received at a server for accessing a streaming file;
code for determining, for each of said at least one request, a segment of said streaming file accessed during the time interval of interest; and
code for determining, if multiple requests are identified for said streaming file during said time interval of interest, at least one unique segment of said streaming file that was most recently accessed within said time interval of interest.

25. The computer-executable software code of claim 24 further comprising:
code for identifying whether multiple requests were made for said streaming file during said time interval of interest.

26. The computer-executable software code of claim 25 wherein if only one request is identified for said streaming file during said time interval of interest, then said code for determining at least one unique segment of said streaming file determining a segment of said streaming file accessed by said one request as being a unique segment of said streaming file that was most recently accessed within said time interval of interest.

27. The computer-executable software code of claim 24 wherein said code for determining at least one unique segment comprises:
code for determining the at least one unique segment from the determined segments of said streaming file accessed by each of said multiple requests.

28. The computer-executable software code of claim 24 wherein said code for determining at least one unique segment comprises:
code for performing segment subtraction between said multiple requests identified for said streaming file.

29. A method of modeling streaming file accesses, said method comprising:
creating a segment-based data structure modeling streaming file accesses, wherein the data structure for a streaming file comprises (a) identification of at least one unique segment of the streaming file that was accessed by at least one client of a media server, and
(b) identification of a corresponding timestamp of a most recent access of each of said at least one unique segment, wherein said creating a segment-based data structure comprises:

determining all segments of said streaming file accessed by clients of a server during a time interval of interest;

determining corresponding timestamps of accesses of each segment; and determining a most recent access of each segment.

* * * * *